CROSSBAR SWITCH HAVING CO-PLANAR CONTACTS RESPONSIVE TO OPERATION BY VIBRATION LIMITED FINGERS

Filed Feb. 5, 1965 3 Sheets-Sheet 1

INVENTOR
A. C. KELLER
BY
ATTORNEY

Jan. 30, 1968 A. C. KELLER 3,366,901

CROSSBAR SWITCH HAVING CO-PLANAR CONTACTS RESPONSIVE TO OPERATION BY VIBRATION LIMITED FINGERS

Filed Feb. 5, 1965 3 Sheets-Sheet 2

Jan. 30, 1968 A. C. KELLER 3,366,901

CROSSBAR SWITCH HAVING CO-PLANAR CONTACTS RESPONSIVE TO OPERATION BY VIBRATION LIMITED FINGERS

Filed Feb. 5, 1965 3 Sheets-Sheet 3

United States Patent Office 3,366,901
Patented Jan. 30, 1968

3,366,901

CROSSBAR SWITCH HAVING CO-PLANAR CONTACTS RESPONSIVE TO OPERATION BY VIBRATION LIMITED FINGERS

Arthur C. Keller, Bronxville, N.Y., assignor to Bell Telephone Laboratories, Incorporated, New York, N.Y., a corporation of New York Filed Feb. 5, 1965, Ser. No. 430,584
10 Claims. (Cl. 335—112)

ABSTRACT OF THE DISCLOSURE

In this crossbar switch a plurality of contact assemblies are combined with a select-hold bar assembly and a frame. Each contact assembly includes contact pairs disposed in co-planar sheets, cards for grouping the contacts into crosspoints, and fingers for operating the cards associated with selected crosspoints. The select-hold bar assembly includes hold and select bars of the reciprocally acting type. Each hold bar includes a plurality of slots and each slot encircles a finger in a vibration limiting embrace.

This invention relates to switching devices and particularly to switching devices of the crossbar type.

Broadly, the object of this invention is to provide a crossbar switch that is electrically interchangeable with, but substantially smaller, substantially faster acting, and more reliable than, available crossbar switches.

Crossbar type switches typically comprise a frame, a plurality of crosspoints wherein each crosspoint is made up of one or more contact pairs, and a plurality of horizontal and vertical members arranged to cooperate with each other to actuate selected crosspoints.

Switches of the crossbar type are especially suitable for use in telephone systems. Telephone systems, however, require crosspoints by the thousands. Because they are used in such volume, crosspoints occupy a substantial portion of telephone central office space. Accordingly, improved use of central office space is obtained by reducing the space occupied by the crosspoints.

One specific object of this invention, therefore, is to reduce the size of crossbar switches.

The crosspoints in each crossbar switch are opened and closed many thousands of times. As a result, deposits build up, pits appear, and other mechanical changes take place on the crosspoint contacts. Many of these changes adversely affect service. Consequently, each crossbar switch requires periodic maintenance. In view of the huge number of crossbar switches that are used, maintenance thereof is very costly in telephone systems.

Accordingly, it is another specific object of this invention to reduce the amount of maintenance required for a crossbar switch.

In telephone systems, crossbar switches are used for interconnecting various types of equipment. The number of contacts which are required to connect one piece of equipment to another, however, will vary depending on the nature of the equipments being interconnected. For example, in the Bell System, one type of crossbar switch uses four contact pairs per crosspoint, while another type uses six contact pairs per crosspoint.

It is, therefore, another specific object of this invention to provide a crossbar switch in which the number of contacts per crosspoint may readily be varied.

In one type of crossbar switch to which this invention particularly applies, the switch components include a plurality of flexible fingers, a plurality of operators, a plurality of crosspoints, and a select-hold bar assembly. The select-hold bar assembly includes a plurality of intersecting hold and select bars which cooperate with each other to select and move the fingers, and the crosspoints, operators, and fingers are grouped in such a manner that each operator actuates a crosspoint in response to the selection and movement of a finger. The fingers are typically mounted in rows with one end fixed and one end free.

In operation, the select-hold bar assembly selects one finger in a row and then actuates all of the fingers in the row. As it is actuated with the row, the selected finger, in turn, actuates its associated operator and opens or closes a crosspoint.

The select-hold bar assembly makes a finger selection by deflecting the free end of a finger to a predetermined position. This position is adjacent to the operator associated with the selected finger. If, however, the free end fails to move to its predetermined position, the selection is ineffective and the selected finger will fail to actuate its operator. Thus, positioning of the free end is a critical step in switch operation.

Finger positioning is affected by the nature of the fingers. Because of the manner in which each is mounted, the free ends of the fingers can vibrate and cause the free end of a selected finger to move in and out of its predetermined position independently of the select-hold bar assembly. As a result, the switch is susceptible to false operation.

Heretofore, in order to insure against false operation, an interval for allowing finger vibration to cease has been included in the overall time period required for switch operation. The nature of the modern telephone switching system, however, demands rapid operation of the mechanical crosspoints. Accordingly, it is advantageous to eliminate the aforesaid interval by preventing finger vibration and thereby reduce the overall time period required for switch operation.

It is, therefore, an object of this invention to increase the speed at which crossbar switches operate.

Moreover, it is a specific object of this invention to eliminate any time delay in the operation of a crossbar switch which is attributable to finger vibration.

In accordance with a preferred embodiment of this invention, a select-hold bar assembly is combined in a crossbar switch with a plurality of unitary contact assemblies. According to one feature of this invention, each unitary contact assembly comprises a support, a plurality of contacts mounted on the support, a plurality of cards which group the contacts into a plurality of crosspoints, and a plurality of select fingers mounted on the support wherein each select finger is associated with and operates a crosspoint.

Provision is made in each support member whereby each support member can be readily mounted in and removed from a crossbar switch assembly. As a result interchangeable contact assemblies can be assembled which contain a variety of contact arrangements. Hence, a crossbar switch utilizing such contact assemblies can readily be adapted to meet a variety of switching requirements.

According to another feature of this invention, all of the contacts in each contact assembly are arranged side by side in two parallel planes on the support. The contacts are so disposed that the contacts in one plane are associated with the contacts in the other plane to form a plurality of contact pairs.

With the foregoing arrangement, maintenance requirements are reduced. For example, when the contacts are disposed side by side, cleaning is easier than when the contacts are stacked one above the other. Moreover, contacts disposed side by side are inherently more stable and develop fewer troubles than contacts arranged in a conventional pile-up. Furthermore, space is conserved when the contacts are positioned side by side in common planes.

Finally, disposing the contacts side by side allows the contact content of the crosspoints to be regulated by the cards. For example, the number of crosspoints in each contact assembly may be varied merely by changing card configuration.

According to another feature of this invention, the hold bars in each select-hold bar assembly are equipped with slots that embrace the fingers and prevent vibration thereof. With finger vibration eliminated, a time delay to allow for cessation of finger vibration is no longer required and the time required for switch operation is substantially reduced.

In accordance with still another feature of this invention, the time required to operate a crossbar switch is further reduced by energizing the relays which operate the select bars and the hold bars simultaneously. With finger vibration eliminated, the moving elements can be adjusted so that selection will be completed before the holding operation begins when both relays are energized simultaneously.

Other objects and features of this invention will become readily apparent from the following detailed description when taken in conjunction with the drawing in which.

The crossbar type switch in which this invention is embodied divides naturally into three major components, viz., a support, a switching unit, and a select-hold bar unit. In the following description, each of these components will be taken up in order and discussed in detail. As will be described hereafter, these components cooperate with each other to produce a crossbar switch that is electrically interchangeable with, but substantially smaller, substantially faster acting, and more reliable than, available crossbar switches.

Figure 1:
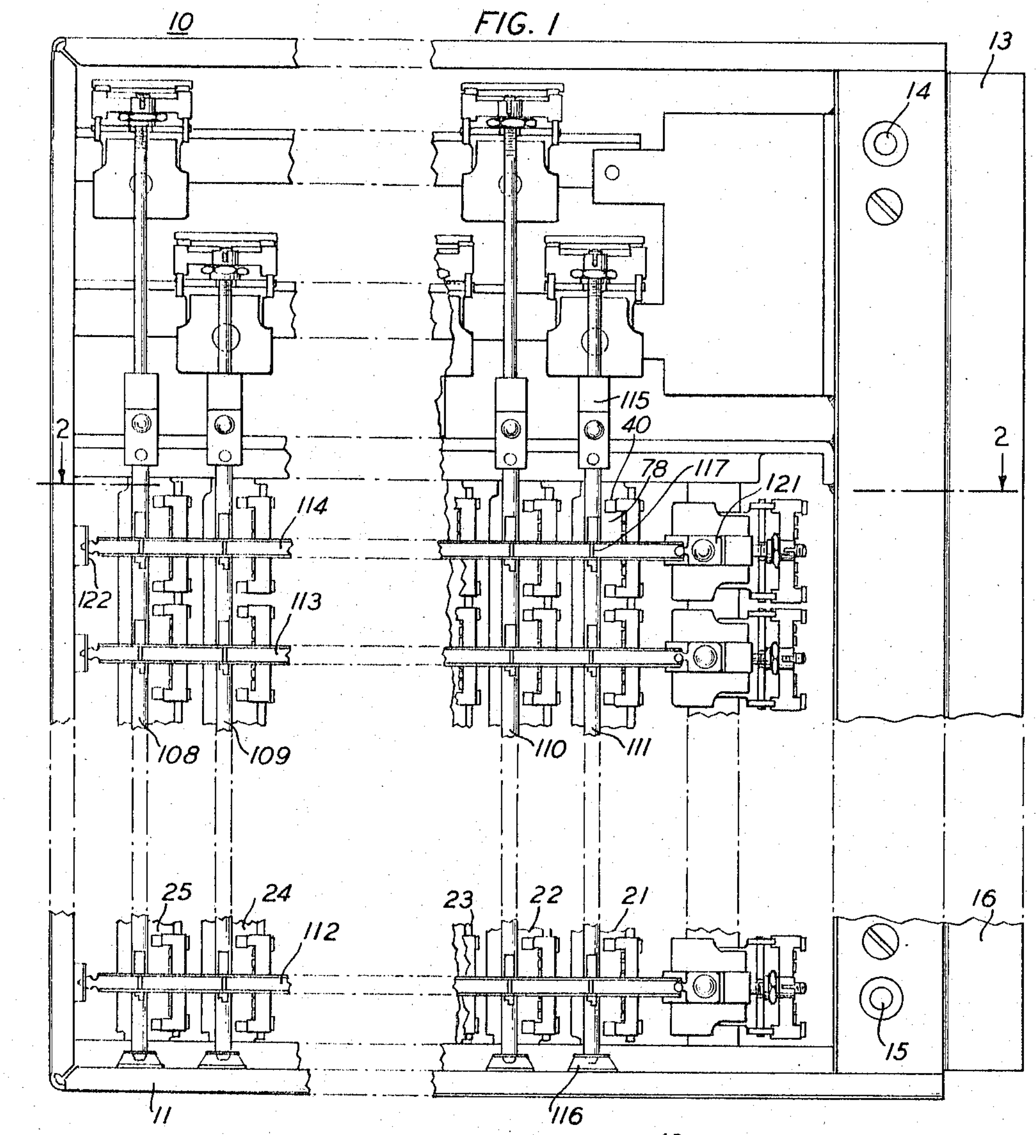
FIG. 1 is a front elevation view of a crossbar switch embodying this invention.
Figure 2:
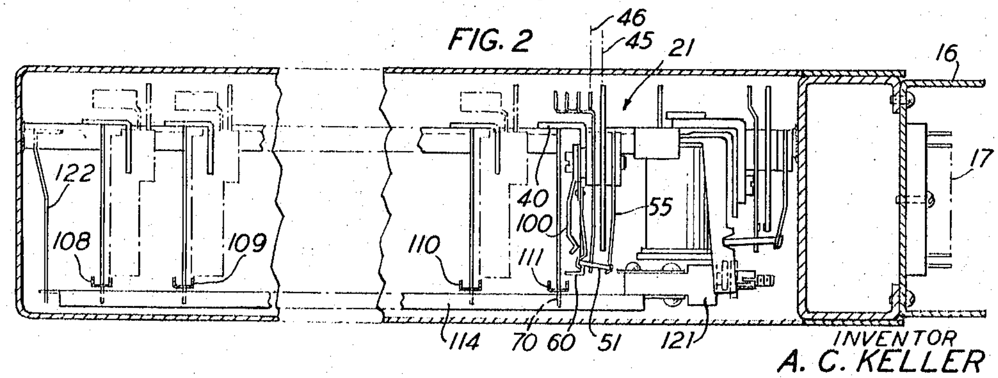
FIG. 2 is a sectional view taken along line 2—2 of FIG. 1.

Referring to the drawing, and FIGS. 1 and 2 in particular, the support which is the first major component comprises a frame 11 which serves as a base for supporting the remaining components. The frame 11 is substantially rectangular in form and is preferably made of sheet steel although it could easily be made from other materials such as plastic or the like.

The frame 11 includes a portion 13 having mounting holes 14 and 15 which can be used to mount the frame in a switching application. Moreover, the portion 13 includes a mounting 16 to which terminal blocks 17 are attached. The terminal blocks 17 are arranged to connect equipments terminated thereon with the switching unit. The terminal blocks 17 readily adapt to soldered connections, solderless wrapped connections, or plug-in terminals.

The second major component which is the switching unit opens and closes electrical paths leading to the equipments terminated on the terminal blocks 17. As illustrated in FIG. 1, the switching unit comprises a plurality of unitary contact assemblies. Five such assemblies 21, 22, 23, 24, and 25 are shown in FIG. 1. Each assembly contains a plurality of crosspoints and each is attached to the frome 11 in such a manner that it can be readily mounted or dismounted.

Figure 3:
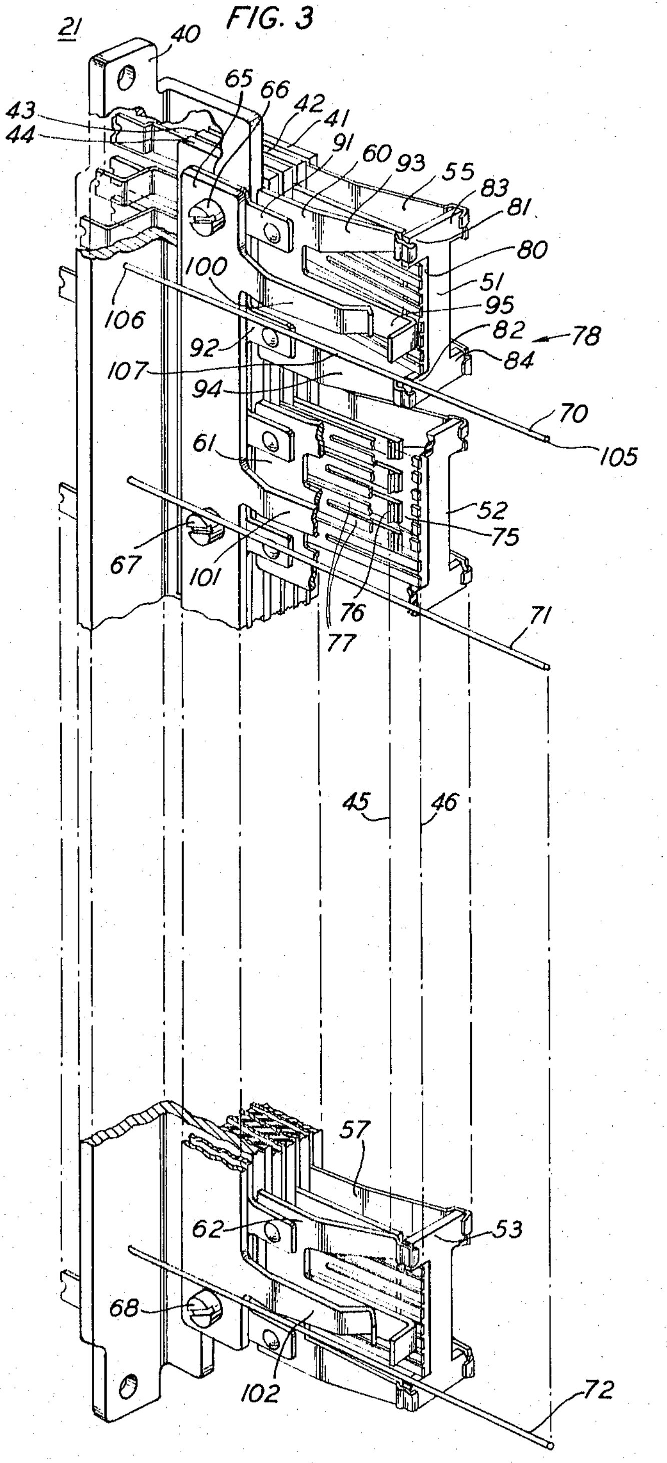
FIG. 3 is a perspective view showing a multiplicity of crosspoints arranged in a unitary assembly with one of the crosspoints partially broken away to show the coplanar relationship of the contacts.

The assembly 21, illustrated in detail in FIG. 3, is typical and comprises a support 40; a plurality of insulators 41, 42, 43, and 44; a plurality of contacts disposed in two common planes which are identified by the lines 45 and 46, respectively; a plurality of cards such as the cards 51, 52, and 53; a plurality of biasing springs such as the springs 55, 56, and 57; a plurality of operators such as the operators 60, 61, and 62; a stop assembly 65; a plurality of bolts such as the bolts 66, 67, and 68 for holding the other components on the support 40; and a plurality of fingers 70, 71, and 72. In the following paragraphs, each of these components will be considered in order and described in detail.

The insulators 41, 42, 43, and 44 are mounted on the support 40 and space the contacts, the biasing springs, and the operators from each other. In the embodiment illustrated, they are made of phenol fibre, but any other electrically insulating material will serve as well.

The contacts all lie in two parallel planes. The two planes are identified in FIGS. 2 and 3 by the lines 45 and 46, respectively. The contacts in both planes extend out from the support 40 in an arrangement wherein contacts from one plane cooperate with contacts from the other plane to form contact pairs.

A typical contact pair 75 is shown in FIG. 3. As illustrated therein, the contact pair 75 consists of a fixed contact 76 from the plane identified by the line 45 and a movable contact 77 from the plane identified by the line 46. The movable contact 77, along with all of the other movable contacts lying in the plane identified by the line 46, is bifurcated so as to have twin contacts at one end.

All of the contact pairs are of the pretensioned type. By pretensioned it is meant that the contacts in each pair are internally stressed so as to press against each other and form closed electrical circuits when in the normal condition. In the embodiment disclosed, only the movable contacts are internally stressed. As a result, only the amount of internal stress in each movable contact determines the contact force acting in each contact pair.

The internal stress in each movable contact is obtained by kinking that portion of the contact which is situated between the bifurcated free end and the end immobilized in the support 40. In order that the contact force will be the same in each contact pair, each movable contact must be kinked the same amount. With the arrangement illustrated herein, the contacts can be manufactured and installed on the support 40 in sheets wherein all of the contacts are disposed side by side. Thus, kinking of the movable contacts can be done by the sheet and improved control thereof is obtained.

Furthermore, other improvements in the efficiency of contact manufacturing and handling are obtained. For example, during manufacture, contact buttons, either individually or in strips, can be welded to the free ends of the contacts in a single operation. Moreover, terminal ends can be formed on all of the contacts in a single operation as well. Finally, ease of handling during manufacture is increased since the contacts are processed in sheet form instead of as single items.

Similarly, the task of assembling the contacts on the supports is simplified by keeping the contacts in sheet form. It is only after final assembly on a support that the surplus metal joining the contacts in a sheet is sheared off. Only then do the contacts become separated from each other and ready to be grouped together to form crosspoints.

Figure 4:
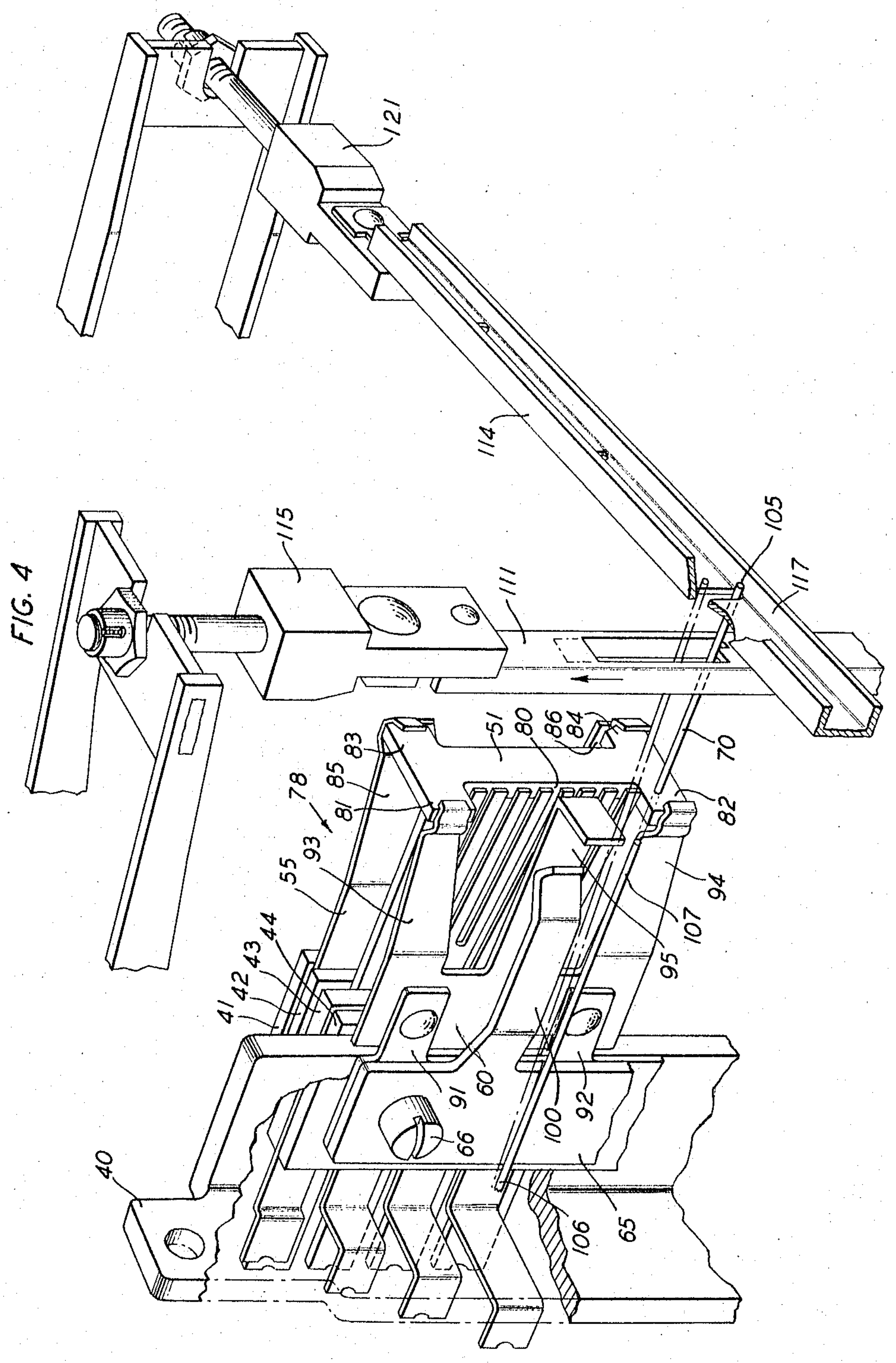
FIG. 4 is an enlarged perspective view showing a single crosspoint taken from the assembly shown in FIG. 3 and the apparatus by which it is operated.

The cards group the contact pairs together to establish crosspoints which will operate in response to card movement. A typical crosspoint 78, as defined by the card 51, is illustrated in FIG. 4.

Each card includes a contact portion which engages the free end of the movable contact in each contact pair, a back portion that engages a biasing spring, and a front portion that engages an operator. The card 51, illustrated in FIG. 4, is typical and includes a contact portion 80 which engages the movable contacts in the crosspoint 78, a front portion comprising two ears 81 and 82 which engage the operator 60, and a rear portion comprising two ears 83 and 84 which engage the biasing spring 55.

The biasing spring 55, as well as all of the other biasing springs, has one end which is secured to the support 40 between the insulators 41 and 42, and one end which terminates in two projections. The projections 85 and 86 on the biasing spring 55 are cupped around the ears 83 and 84, respectively, on the card 51.

All of the biasing springs are pretensioned to exert a biasing force against the cards. This biasing force urges the contact portion of each card against the free end of the movable contacts in each crosspoint. Further, the magnitude of the biasing force is such that it exceeds the magnitude of the pretensioning force supplied by the movable contacts. As a result, an unbalanced force acts on the cards, the cards move, the movable contacts separate from the fixed contacts, and the crosspoints open. Thereafter, the switching condition of the crosspoints is regulated by the operators.

The operators control the switching condition of the crosspoints by overcoming the unbalanced forces acting therein. The operator 60, which is typical of the others, operates the crosspoint 78 and includes a flexible end, a card engaging end, and a control portion. The flexible end comprises two spring members 91 and 92 riveted to the card engaging end; the card engaging end comprises two projections 93 and 94; and the control portion comprises an L-shaped projection 95. The spring members 91 and 92 are secured between the support 40 and the stop assembly 65; the projections 93 and 94 are cupped around the ears 83 and 84, respectively, on the card 51; and the L-shaped projection 95 is arranged to interact with the stop assembly 65 and the finger 70.

The stop assembly 65 exerts a force on the operators which limits their travel in the direction in which they move when the crosspoints open. As illustrated in FIG. 3, the stop assembly 65 includes a plurality of stops such as the stops 100, 101, and 102. The stops are all substantially immobile and each includes a part arranged to engage the control portion of an operator.

The stop 100 is typical and engages the projection 95 to limit the travel of the operator 60 when it moves in response to the urging of the biasing spring 55. The operator 60, when so limited by the stop 100, assumes a rest position wherein the movable contacts and the fixed contacts in the crosspoint 78 are separated by a spaced distance.

The fingers exert a force on the operators which moves them out of their rest position and causes the crosspoints to close. As shown in FIG. 3, the fingers are mounted on the support 40 with each finger associated with an operator. The fingers, however, are arranged to reciprocate between a rest and an operate position. When in the operate position, each finger is adjacent to an operator and can close a crosspoint. When in the rest position, however, each finger is not adjacent to an operator and cannot close the crosspoints.

The finger 70, illustrated in FIG. 4, is typical and is shown in the rest position. When moved to the operating position, as indicated in phantom in FIG. 4, it will be adjacent to and ready for engagement with the operator 60.

The finger 70 includes a free end 105, a fixed end 106, and an intermediate portion 107. When mounted on support 40, the fixed end 106 is immobilized, the intermediate portion 107 is positioned to be able to engage the operator 60 by the foot of the L-shaped projection 95, and the free end 106 is coupled to the select-hold bar unit. The select-hold bar unit is arranged to move the free end 106 from the rest position to the operate position and then toward the operator 60 until the intermediate portion 107 causes the crosspoint 78 to close. This completes the description of the assembly 21 and its components.

Returning now to the description of the remaining major component of the crossbar switch 10, the select-hold bar unit illustrated in FIG. 1 comprises a plurality of select bars such as the select bars 108, 109, 110, and 111; a plurality of hold bars such as the hold bars 112, 113, and 114; and a plurality of operating magnets. These components are described in detail in the following paragraphs.

The select bars select crosspoints for operation and are mounted on the frame 11 in parallel with one another. Each select bar is preferably channel-shaped for maximum strength and rigidity with minimum weight. The select bar 111 shown in FIG. 1 is typical. It is connected to an operating magnet 115 at one end and to a spring 116 at the other end. Furthermore, it includes a plurality of apertures distributed along its length.

As can best be seen from FIG. 4, all of the select bars are disposed on the frame 11 so that each aperture therein embraces a finger. The apertures are designed to shift fingers from the rest position to the operate position thereby giving the shifted fingers the capacity to operate their associated crosspoints. For example, movement of the select bar 111 will shift the finger 70 to the operate position and bring the intermediate portion 107 thereof adjacent to the foot of the L-shaped projection 95.

The hold bars are arranged to move the fingers toward and away from the L-shaped projections. All of the hold bars are mounted on the frame 11 in parallel with each other but at right angles to the select bars. Furthermore, the hold bars are preferably channel-shaped for maximum strength and rigidity with minimum weight. As illustrated in FIG. 1, the hold bars cooperate with select bars to form a plurality of intersecting points. Each of the intersecting points is superimposed over a crosspoint as, for example, the intersecting point 117 over the crosspoint 78.

The hold bar 114 is typical. One end thereof is connected to an operating magnet 121, one end is connected to a spring 122, and a plurality of slots are distributed along its length. As can best be seen from FIG. 4, the fingers extending from the supports protrude through the slots.

The fingers are positioned in the hold bars so that each fingers bears continuously on one side of the slot through which it protrudes. As a result, the ends of the fingers are frictionally damped and vibratory motion between the rest and operating positions is virtually eliminated.

The friction force damping the fingers, however, must be adjusted so that it will not prevent all free movement of the fingers. The fingers must be able to return unaided to their rest positions, as illustrated in FIG. 4, when the hold bar returns to its unoperated state. The required adjustment is most conveniently obtained by kinking each finger. The kink must be adjusted until the finger, when in the rest position, exerts approximately two grams of force against the long side and approximately six grams of force against the bottom of its slot. Where the switch is to be used under conditions wherein material will tend to accumulate on the fingers, the fingers can also be coated with Teflon to prevent sticking.

Finally, the width of each slot is regulated so as to be slightly larger than the outside diameter of the finger it contains. Consequently, vibratory motion toward and away from the L-shaped projection is virtually eliminated. Thus, the slots prevent significant vibration of the fingers in all directions without restraining the free movement thereof.

The select and hold bars cooperate with each other in response to actuation of the operating magnets. The operating magnets comprise a plurality of select magnets associated with the select bars and a plurality of hold magnets associated with the hold bars. Each operating magnet includes an armature, a rod connecting the armature to the bars, a plurality of contacts responsive to armature movement to indicate the off-normal condition, and a motor assembly for energizing the armature.

As can be seen from FIG. 1, the select magnets can be assembled on common brackets for convenient mounting in the frame 11. Moreover, the hold magnets can be assembled in a similar manner.

In the operation of the crossbar switch 10, a select bar and a hold bar interact to operate a crosspoint located at the point where the bars intersect. For example, the crosspoint 78 will operate in response to interaction between the select bar 111 and the hold bar 114. The following paragraphs will describe the operation of the crosspoint 78 in detail.

The select bar 111 moves in response to energization of the select magnet 115. When it moves, the select bar 111 flexes the spring 116 and transfers each finger embraced within its apertures from the rest position to the operate position.

Similarly, the hold bar 114 moves in response to energization of the hold magnet 121. When the hold bar 114 moves, the spring 122 is flexed and each finger embraced in a slot therein is carried toward the L-shaped projection in the crosspoint with which it is associated.

In the condition described, only the finger 70 closes a crosspoint. This is because out of all the fingers moved by the hold bar 114 only the finger 70 was in position to engage an operator. None of the other fingers had been moved from the rest position by a select bar. Thus, none of the other fingers could engage an operator and only the crosspoint 78 closes.

After the hold bar 114 has moved, the select magnet 115 is de-energized and the spring 116 returns the select bar 111 to its beginning position. The crosspoint 78, however, remains closed until the hold bar 114 is released by the hold magnet 121.

When the hold magnet 121 releases, the hold bar 114 is returned to its beginning position by the spring 122 and the pressure it had exerted on the finger 70 is released. As a result, the finger 70 returns to the rest position and the crosspoint 78 opens.

As has been described heretofore, the fingers, hold bars, and slots cooperate to eliminate finger vibration. As a result, substantially increased switching speeds are obtained in switches using conventional select and hold magnets, i.e., where the resistances of the magnets are approximately 600 and 1600 ohms, respectively. In such switches, the time delay heretofore required between the time the select magnet is energized and the time the hold magnet is energized is no longer required because significant vibration in the fingers has been eliminated. As a result, a new mode of select-hold magnet operation is utilized wherein both magnets are energized simultaneously. This mode of operation has produced switching speeds up to five times faster than those heretofore available.

In addition to an increase in speed, the switch disclosed herein is also capable of a variety of switching applications. For example, the embodiment illustrated in FIG. 3 is arranged to have four contact pairs per crosspoint. However, since the contacts are disposed in coplanar relationship, the number of contact pairs per crosspoint need not be fixed and adjustments thereof are easily made. Thus, a crosspoint containing six contact pairs and a crosspoint containing two contact pairs can be obtained merely by modifying the configuration of adjacent cards.

As to the embodiment shown in FIG. 3, however, more than card modification alone is required. In that embodiment, the operators must be replaced as well. The operators, however, are readily replaced merely by removing the bolts 66, 67, 68, etc., removing the stop assembly 65, removing the old operator, inserting the new operator, and re-assembling the stop assembly 65 on the support 40 with the bolts 66, 67, 68, etc. Thus, a single crossbar switch may readily be adjusted to accommodate equipments having a variety of contact pair requirements.

In addition to regulating the size of the crosspoints, the cards may also be used to regulate the operating sequence of the contact pairs. For example, the card 51, illustrated in FIG. 4, is easily modified to cause the contact pairs in the crosspoint 78 to operate in sequence instead of simultaneously. This is accomplished merely by cutting notches in the contact portion 80 beneath the movable contacts. The depth of the notches will determine the order of contact operation. Thus, the disclosed crossbar switch is capable of serving either equipments which require simultaneous contact operation or equipments which require sequential contact operation.

In the crossbar switch as disclosed, the crosspoints are all shown as comprising make contacts only. However, other contact arrangements are readily obtained. For example, interchanging the movable contacts and the fixed contacts from one plane to the other will produce break contacts instead of make contacts. Moreover, combining a make contact arrangement with a break contact arrangement will produce a transfer function. Thus, the disclosed switch is capable of a variety of switching functions.

Finally, the operating magnets which control the hold bars may be modified to minimize the power required in operating the disclosed switch. The hold magnets can be modified to include a remanent core. Thus, outside current will not be required to maintain the hold bar in the operated position and power requirements to operate the switch will be reduced. Such remanent cores are conventional and their use and operation in the application described is well known.

Accordingly, there has been disclosed herein a new and novel crossbar switch that is substantially faster and more versatile than those heretofore available. It is to be understood, however, that the embodiments disclosed herein are illustrative of the principles of the invention only. Many other structural modifications may be devised by those skilled in the art without departing from the spirit and scope of the invention.

What is claimed is:

1. In a switching device the combination comprising:
a plurality of contact assemblies wherein each contact assembly includes a plurality of fingers and a plurality of crosspoints susceptible to false operation due to finger vibration, each of said fingers having one immobilized end and one free end, and each of said crosspoints adapted to operatively respond to movement of the free end of a finger;
a select-hold bar assembly; and
means coupling said fingers to said select-hold bar assembly, said coupling means including a reciprocally acting select bar for selecting the free end of a finger and a reciprocally acting hold bar for moving the selected free end in order to operate a crosspoint and for frictionally restraining free movement of said fingers in all directions whereby the free ends of said fingers are able to move in response to operation of said select-hold bar assembly but are unable to vibrate.

2. A switching device as defined in claim 1 wherein said coupling means includes a plurality of slots cut in said hold bar and a plurality of apertures cut in said select bar, said slots and apertures being superimposed to form pairs and disposed so that every pair so formed is adjacent to a crosspoint and embraces a finger, said slots each having the edge thereof in continuous contact with its embraced finger whereby a continuous force of friction is imposed upon said finger and vibration is restrained.

3. In a switching device the combination comprising:
an assembly of crosspoints and cards wherein each crosspoint includes a card and a plurality of contacts arranged to cooperate with each other in contact pairs, all of the contacts in said assembly being distributed in two common planes and each contact pair in said assembly consisting of a fixed contact from one plane and a movable contact from the other plane, said movable contact being internally stressed to bear against said fixed contact in the normal position and said card being positioned perpendicularly to said two common planes and adjacent to the movable contacts in each contact pair; and
means for operating said cards to operate said crosspoints, said means including a plurality of reciprocally acting hold bars and a plurality of fingers for operating said cards, each of said hold bars being equipped with a plurality of slots and each of said fingers having one immobilized end, one mobile end encircled and frictionally embraced by a slot in a hold bar and an intermediate portion operatively associated with a card.

4. In a switching device the combination comprising:
a plurality of unitary contact assemblies wherein each contact assembly includes a plurality of fingers susceptible to vibration and a plurality of crosspoints operably responsive to movement of said fingers, said crosspoints being susceptible to false operation due to vibration of said fingers;
a plurality of reciprocally acting select bars for selecting fingers to be moved;
a plurality of reciprocally acting hold bars for moving selected fingers, said hold bars being positioned perpendicularly to said select bars to form intercepting points wherein each intercepting point is adjacent to a crosspoint; and
a plurality of apertures in said select bars and a plurality of slots in said hold bars for moving said fingers, each of said slots encircling a finger and having the edges thereof in continuous contact with said fingers whereby said fingers are held in an embrace free of vibration and false crosspoint operation due to finger vibration is prevented.

5. A switching device as defined in claim 4 wherein the width of each slot is substantially equal to a cross sectional dimension of a finger.

6. In a switching device the combination comprising:
a plurality of unitary contact assemblies wherein each unitary contact assembly includes a plurality of contacts disposed in two parallel planes and arranged in pretensioned pairs, a plurality of cards for grouping said contacts into a plurality of crosspoints and for actuating said crosspoints, each of said cards disposed perpendicularly to said two parallel planes and in abutting relationship to the contacts lying in one of said two parallel planes, and a plurality of fingers for moving said cards, each of said fingers and each of said cards being associated with a single crosspoint; and
means for selecting and moving a finger whereby the crosspoint associated with the card moved by said selected finger is actuated.

7. In a switching device the combination comprising:
support means;
a plurality of contacts disposed on said support means in a first plane;
a plurality of contacts disposed on said support means in a second plane, the contacts in said first plane and the contacts in said second plane arranged to engage each other in pretensioned contact pairs;
a plurality of cards disposed between said first and second planes for grouping said pretensioned contact pairs into a plurality of crosspoints and for separating said pretensioned contact pairs; and a plurality of bendable fingers extending from said support means in an arrangement wherein each finger has one end attached to said support means and the other end movable to a position adjacent to a card, said card being actuated by the bending of an adjacent finger to allow the pretensioned contact pairs in a crosspoint to close.

8. In a switching device the combination comprising:
a finger having one end fixed and the other end free;
a crosspoint operable in response to movement of the free end of said finger;
means for operating said cross point by moving the free end of said finger, said means including a hold bar for engaging said finger and for frictionally restraining free movement thereof in all directions; and
whereby false operation of said crosspoint is prevented.

9. A switching device as defined in claim 8 wherein said hold bar includes a slot, said slot encircling said finger and having one dimension substantially equal to a cross sectional dimension of said finger.

10. In a switching device the combination comprising:
a frame having two vertical sides and two horizontal sides;
a plurality of unitary contact assemblies extending between said horizontal sides and spaced in parallel relation with said vertical sides, each unitary contact assembly including a plurality of cards, a plurality of fingers for moving said cards, a plurality of contacts arranged in a first plane, a plurality of contacts arranged in a second plane, the contacts in said first plane being associated with the contacts in said second plane in pairs and grouped in a plurality of crosspoints by said cards, said crosspoints being operatively responsive to movement by said cards and susceptible to false operation due to vibration of said fingers;
a plurality of select bars for selecting fingers, each of said select bars including a plurality of apertures and being disposed on said frame coextensively with a unitary contact assembly so that each aperture therein embraces a finger; and
a plurality of hold bars for moving a selected finger against a card to operate a crosspoint, each of said hold bars including a plurality of slots and being disposed on said frame perpendicularly to said select bars with each slot therein surrounding a select finger in an embrace whereby vibration is suppressed so that false operation of the crosspoints is prevented.

References Cited

UNITED STATES PATENTS

| | | | |
|---|---|---|---|
| 2,338,181 | 1/1944 | Holden | 335—112 |
| 2,364,706 | 12/1944 | Gillings et al. | 200—175 |
| 2,682,584 | 6/1954 | Knapp | 335—129 |

BERNARD A. GILHEANY, *Primary Examiner.*

R. N. ENVALL, JR., *Assistant Examiner.*